United States Patent
Vyas et al.

(10) Patent No.: US 12,229,160 B2
(45) Date of Patent: Feb. 18, 2025

(54) OPTIMIZE WORKLOAD PERFORMANCE BY AUTOMATICALLY DISCOVERING AND IMPLEMENTING IN-MEMORY PERFORMANCE FEATURES

(71) Applicant: Oracle International Corporation, Redwood Shores, CA (US)

(72) Inventors: Nirav Vyas, Karnataka (IN); Hariharan Lakshmanan, Brisbane, CA (US); Shasank Kisan Chavan, Menlo Park, CA (US); Gary Smith, Auburn, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/374,852

(22) Filed: Sep. 29, 2023

(65) Prior Publication Data
US 2024/0111772 A1    Apr. 4, 2024

Related U.S. Application Data

(60) Provisional application No. 63/411,795, filed on Sep. 30, 2022.

(51) Int. Cl.
*G06F 16/27* (2019.01)
*G06F 11/34* (2006.01)
(Continued)

(52) U.S. Cl.
CPC .......... *G06F 16/27* (2019.01); *G06F 11/3414* (2013.01); *G06F 11/3419* (2013.01);
(Continued)

(58) Field of Classification Search
CPC .... G06F 16/2282; G06F 16/214; G06F 16/27; G06F 16/258; G06F 16/24552;
(Continued)

(56) References Cited

U.S. PATENT DOCUMENTS

9,244,980 B1 *   1/2016   Birnbaum .......... G06F 16/24552
10,871,393 B2 * 12/2020   Park ...................... G01J 1/0228
(Continued)

*Primary Examiner* — Etienne P Leroux
(74) *Attorney, Agent, or Firm* — Hickman Becker Bingham Ledesma LLP (57) ABSTRACT

Techniques are provided for optimizing workload performance by automatically discovering and implementing performance optimizations for in-memory units (IMUs). A system maintains a set of IMUs for processing database operations in a database. The system obtains a database workload information for the database system and filters the database workload information to identify database operations in the database workload information that may benefit from performance optimizations. The system analyzes the database operations to identify a set of performance optimizations and ranks the performance optimizations based on their potential benefit. The system selects a subset of the performance optimizations, based on their ranking, and generates new versions of IMUs that reflect the performance optimizations. The system performs verification tests on the new versions of IMUs and analyzes the tests to determine whether the new versions of IMUs yield expected performance benefits. The system then categorizes the new set of IMUs into a first set of IMUs to be retained and a second set of IMUs to be discarded. The system then makes the first set of IMUs available to the current workload and discards the second set of IMUs.

20 Claims, 3 Drawing Sheets

(51) Int. Cl.
*G06F 12/02* (2006.01)
*G06F 16/22* (2019.01)
*G06F 16/23* (2019.01)
*G06F 16/245* (2019.01)
*G06F 16/2453* (2019.01)
*G06F 16/2455* (2019.01)
*G06F 16/25* (2019.01)
*G06F 16/28* (2019.01)

(52) U.S. Cl.
CPC .......... *G06F 12/023* (2013.01); *G06F 16/221* (2019.01); *G06F 16/2219* (2019.01); *G06F 16/2365* (2019.01); *G06F 16/2379* (2019.01); *G06F 16/2453* (2019.01); *G06F 16/24552* (2019.01); *G06F 16/24561* (2019.01); *G06F 16/24569* (2019.01); *G06F 16/258* (2019.01); *G06F 16/285* (2019.01)

(58) Field of Classification Search
CPC ........... G06F 16/24561; G06F 16/2452; G06F 16/285; G06F 16/2219; G06F 16/2365; G06F 16/22; G06F 11/3414; G06F 11/3419; G06F 12/023
See application file for complete search history.

(56) References Cited

U.S. PATENT DOCUMENTS

| | | | | |
|---|---|---|---|---|
| 2014/0089311 | A1* | 3/2014 | Richards | G06F 16/24549 707/E17.046 |
| 2014/0310236 | A1* | 10/2014 | Meng | G06F 16/2379 707/607 |
| 2015/0293964 | A1* | 10/2015 | Morfonios | H04L 43/0817 707/753 |
| 2017/0116274 | A1* | 4/2017 | Weissman | G06F 16/24534 |
| 2017/0344593 | A1* | 11/2017 | Mullick | G06F 16/1873 |
| 2019/0306269 | A1* | 10/2019 | Sofia | H04L 67/51 |
| 2022/0114177 | A1* | 4/2022 | Li | G06F 12/0871 |
| 2022/0365765 | A1* | 11/2022 | Ayuba | G06F 9/45537 |
| 2023/0350715 | A1* | 11/2023 | Knight | G06F 11/3037 |

* cited by examiner

OPTIMIZE WORKLOAD PERFORMANCE BY AUTOMATICALLY DISCOVERING AND IMPLEMENTING IN-MEMORY PERFORMANCE FEATURES

CROSS-REFERENCE TO RELATED APPLICATIONS; BENEFIT CLAIM

This application claims the benefit of Provisional Application 63/411,795, filed Sep. 30, 2022, the entire contents of which is hereby incorporated by reference as if fully set forth herein, under 35 U.S.C. § 119(e).

FIELD OF THE INVENTION

The present invention relates to the field of optimizing workload performance for a database system. Specifically, the present invention is directed to automatically discovering and testing potential in-memory performance optimizations for optimizing workload performance.

BACKGROUND

In-memory databases are purpose-built databases that rely primarily on memory for data storage. In-memory databases are more responsive than a conventional disk-optimized database because accessing data in memory is typically faster than accessing data stored on disk. In-memory databases implement in-memory column stores and advanced query optimizations to run analytic queries at order of magnitude faster than conventional on-disk databases. The in-memory column store is a data structure implemented to store tables and partitions in memory using a columnar format optimized for rapid scans.

With in-memory databases, several different types of performance optimizations are available to improve the processing of analytic queries. For example, performance optimizations such as join groups, in-memory optimized arithmetic, vector optimization, bloom filter optimization, and cold column eviction may be used to further optimize the in-memory database and improve query processing.

A join group is a dictionary object that contains a set of columns on which a set of tables may be joined. For example, if a SALES table and a TIMES table each have a time_id column on which the SALES and TIMES tables are frequently joined, then the join group may contain the time_id columns from both the SALES and TIMES tables. For certain types of queries, the join group may eliminate the processing overhead needed for decompressing and hashing column values.

In-memory optimized arithmetic is a feature that enables the creation of in-memory optimized arithmetic encoded numbers within an in-memory column store. The in-memory optimized arithmetic enables faster arithmetic calculations using single instruction, multiple data (SIMD) hardware, thereby improving performance by performing the arithmetic operations natively on hardware.

Vector optimization refers to a method for converting and storing a number values from a column in binary form, thereby increasing the scanning efficiency.

Bloom filter optimization may include a technique called cache the hash, where values from a column are hashed and stored in a dictionary in order to improve processing speed for bloom filter evaluations during a hash join.

While such optimizations may improve query processing, each optimization also has a cost. In many situations, it is hard to know which optimizations are worth their cost. This problem is particularly severe in systems where the workload changes over time. Consequently, implementing query optimizing data structures for in-memory databases so far has been accomplished through manual intervention. For example, database administrators (DBAs) are tasked with manually analyzing query execution plans in order to identify useful performance features. Once a useful performance feature has been identified, the DBA must estimate the benefits on query performance against the cost of additional memory required to create the performance feature.

Even when the DBA selects a set of optimizations that result in a significant performance increase, the workload may change dynamically, rendering some of the previously identified performance features as obsolete. As a result, DBAs must constantly monitor the workload and remove any no-longer-useful performance features. In light of the foregoing, it is clearly desirable to provide a system that automatically identifies candidate performance features and analyzes whether the identified performance features yield results that make it worthwhile to implement said performance features.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for optimizing workload performance by automatically discovering and implementing in-memory performance optimizations for in-memory units stored within volatile memory. In-memory databases use in-memory column stores to maintain copies of tables, partitions, and individual columns in a columnar format that is optimized for rapid scans.

In an implementation, a database management system maintains a particular set of in-memory units (IMUs) for processing database operations in a database system. The database management system obtains database workload information that reflects the work performed by the database system over a particular period of time. For example, the database workload information may represent the work performed by the database system over a period of 24 hours or any other time period. Upon obtaining the database workload information, the database management system filters the database workload information to identify a subset of the database workload information that contains particular database operations that may benefit from one or more performance optimizations made to one or more IMUs.

The database management system then analyzes the subset of the database workload information to identify a set of performance optimizations that, if implemented, may provide a performance benefit to the particular database operations.

In an implementation, the database management system ranks the identified set of performance optimizations based on which performance optimizations yield the best projected performance benefit. The database management system selects a subset of the set of performance optimizations, based on their ranking, and generates new versions of IMUs that reflect the subset of performance optimizations. The database management system then performs tests on the new versions of IMUs by rerunning the particular operations from the database workload information.

Based on the tests, the database management system performs an analysis to determine whether the subset of performance optimizations in the new versions of IMUs yield expected performance benefits. For example, the database management system may perform a cost benefit analysis to implementing the subset of performance optimizations, where the cost represents the cost to generate the new versions of IMUs with the performance optimizations, and the benefit is the performance benefit achieved.

Based on the analysis, the database management system categorizes the subset of performance optimizations into: (1) a first set of performance optimizations that correspond to a first set of IMUs to be retained, and (2) a second set of performance optimizations that correspond to a second set of IMUs to be discarded. The first set of IMUs, which contain performance optimizations, will be retained and made available to process the current workload because these IMUs yielded expected performance results during the test. The previous version of the IMUs corresponding to the first set of IMUs will be discarded. The second set of IMUs will be discarded as these IMUs, and their corresponding performance optimizations, failed to yield expected performance results. As a result, the previous version of the IMUs, which do not contain performance optimizations and correspond to the second set of IMUs, will be retained and used to process the current workload. The database management system makes the first set of IMUs available to use by a current workload within the database system and deallocates the second set of IMUs.

In an implementation, the database management system monitors the IMUs, including the first set of IMUs, to ensure that the IMUs are performing as expected, based on their performance benefit. The database management system may monitor frequency of use of the performance optimizations to ensure that the current database workload information still uses the IMUs with the performance optimizations. If a particular IMU with a performance optimization is not used anymore, then the database management system may deallocate the particular IMU. In another example, the database management system may monitor whether queries, that previously relied on performance optimizations, still use the performance optimizations for executing the query. For example, a particular query containing a join clause may rely on a particular performance optimization in a particular IMU. If the query plan for the particular query changes, such that the particular performance optimization is no longer needed, then the database management system may detect the change during monitoring and may remove the particular performance optimization from the particular IMU. The monitoring performed by the database management system provides a mechanism to ensure that IMUs are performing efficiently and are actively used by the current database workload information.

By automatically discovering and implementing in-memory performance optimizations in IMUs, database management systems may improve the processing efficiency of database workloads. Furthermore, by monitoring implemented performance optimizations in IMUs, the database management system may more efficiently identify optimizations that may lose their effectiveness due to a changing workload.

Structural Overview

Figure 1:
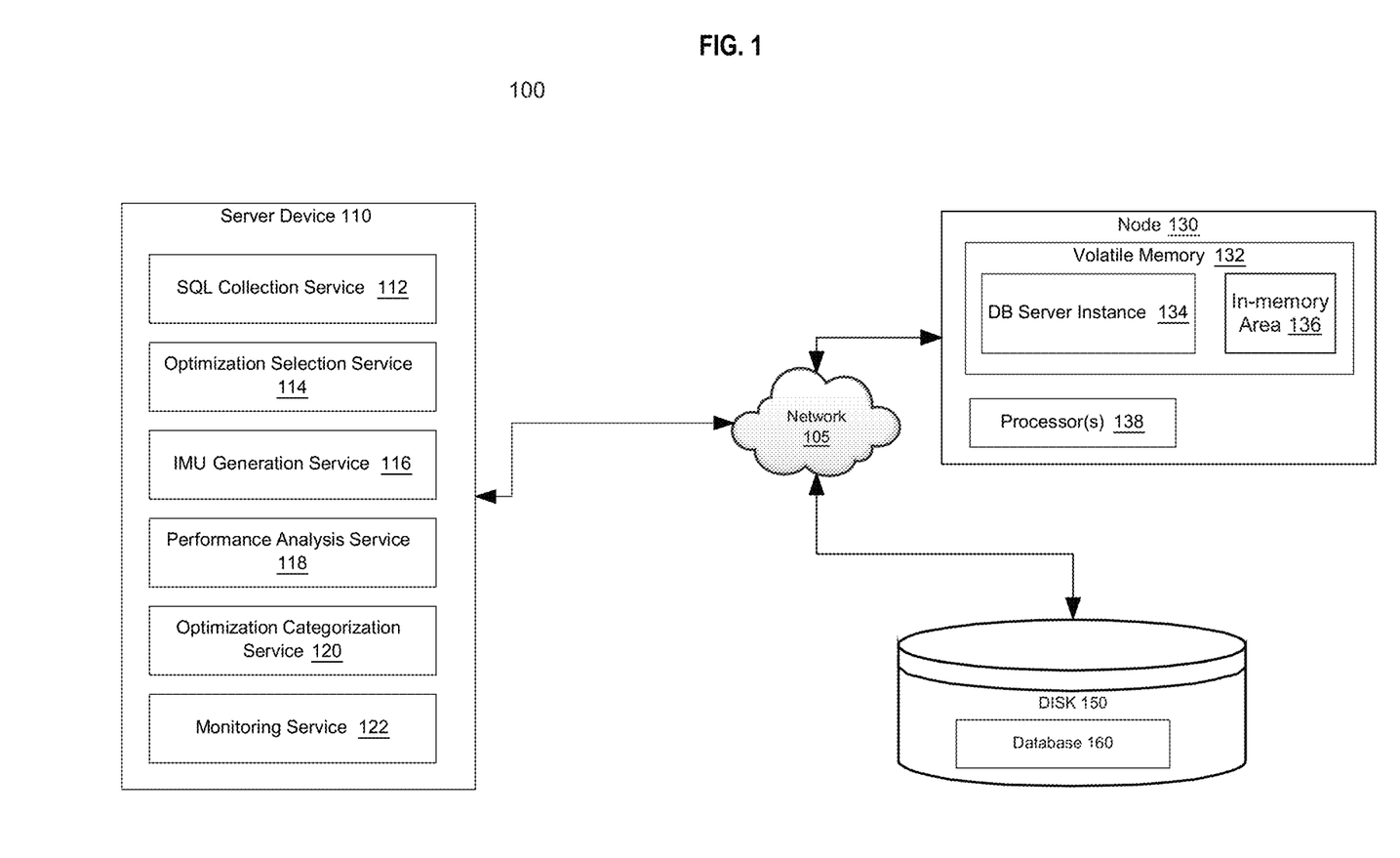
FIG. 1 is a block diagram that depicts a database management system, according to an embodiment.

FIG. 1 is a block diagram that depicts a database management system (DBMS), according to an embodiment. DBMS 100 includes server device 110, node 130, and disk 150 communicatively connected via network 105. For the purpose of illustration, DBMS 100 depicts a singular server device 110 and a single node 130, but in alternative implementations DBMS 100 may comprise additional server devices and additional nodes. Network 105 may be any type of network that provides communications, exchanges information, and/or facilitates the exchange of data between components of the DBMS 100. For instance, network 105 may represent one or more local area networks (LANs), wide area networks (WANs), metropolitan area networks (MANs), or any other network implemented to facilitate data exchange between the components of the DBMS 100.

In an implementation, node 130 includes one or more processors, depicted as processors 138, which is connected to volatile memory 132 via a bus. Node 130 is implemented to run one or more database (DB) server instances. DB server instance 134 is depicted as being stored within volatile memory 132. The illustrated implementation depicts node 130 as executing a single database server instance, in alternative implementations a single node may execute more than one database server instance. In-memory area 136 represents a portion of volatile memory 132 that contains in-memory column stores. The in-memory area 136 is located within a part of volatile memory 132 that contains system global area (SGA). The SGA represents a shared memory area that is used to store information that is shared between a database and user processes. The main components that make up the SGA include a database buffer cache, a shared pool, and redo log buffers. The in-memory column stores contain copies of tables and partitions in a columnar format optimized for rapid scans. For instance, the in-memory column stores contain IMUs.

Node 130 has access to database 160. For the purposes of illustration, database 160 is shown as stored on a single shared disk 150, but in alternative embodiments database 160 may be spread across multiple disks to which node 130 has access.

Server device 110 represents a computing device, such as a server computer, implemented to execute services for optimizing workload performance by automatically discovering and implementing in-memory performance optimizations. In an implementation, server device 110 includes a structured query language (SQL) collection service 112, an optimized selection service 114, an in-memory unit (IMU) generation service 116, a performance analysis service 118, an optimized categorization service 120, and a monitoring service 122. In other implementations, DB server instance 134 may be running on server device 110 with the services of server device 110 running as foreground and background processes.

In an implementation, the SQL collection service 112 is configured to collect SQL commands executed on DB server instance 134. The SQL collection service 112 is configured to capture the executed SQL commands and generate representative database workload information for DB instance 134. The SQL collection service 112 may periodically collect newly executed SQL commands executed on DB server instance 138 and add the newly executed SQL commands to the database workload information. For example, the SQL collection service 112 may be configured to collect the executed SQL commands, from DB instance 134, every 15 minutes. The newly collected SQL commands are then added to the current database workload information. In other examples, the SQL collection service 112 may vary the time between collections. For instance, the SQL collection service 112 may periodically collect executed SQL commands every minute, every 5 minutes, every hour, every day, or based on any other defined duration. By periodically updating the database workload information, the SQL collection service 112 ensures that the database workload information is an accurate representation of SQL commands recently executed on DB server instance 134.

Optimization Selection Service

In an implementation, the optimization selection service 114 is implemented to analyze the database workload information for SQL commands that may benefit from implementing performance optimizations on IMUs and identify a set of potential performance optimizations for the SQL commands. The optimization selection service 114 may then rank the performance optimizations based on a predicted performance benefit. Upon identifying the set of performance optimizations, the optimization selection service 114 selects a subset of the set of performance optimizations, based on the ranking, to be implemented within the in-memory area 136.

The optimization selection service 114 analyzes the database workload information to identify a subset of the database workload information that contains SQL commands that would benefit from performance optimizations. For instance, certain SELECT statements may contain references to tables and conditional statements that could benefit from potential performance optimizations. For example, if a SELECT statement contains a join clause between two tables, then the optimization selection service 114 may identify the SELECT statement as a potential statement that could benefit from enabling a join group on the columns referenced in the join clause. In another example, a SELECT statement contains an arithmetic operation, such as SUM (number_col), which is a function to calculate the sum of values in the number_col column. The optimization selection service 114 may identify this type of SELECT statement as a potential statement that could benefit from optimized arithmetic operations. Upon identifying the SQL commands in the subset of workload information that may benefit from performance optimizations, the optimization selection service 114, generates a set of performance optimizations that represent all of the possible performance optimizations that may be applied to the identified SQL commands in the subset of workload information.

In an implementation, the optimized selection service 114 ranks each of the performance optimizations in the set of performance optimizations based on which optimizations yield the best potential performance benefit. Potential performance benefit may be based on factors such as frequency count, execution count, and volatility of tables. Frequency count refers to the number of times a clause is used in database operations within the database workload information. For example, a particular join clause, such as "where TABLE1.column_1=TABLE2.column_2, may benefit from implementing a performance optimization and may be used in several different select statements. The optimized selection service 114 may determine the frequency count for the particular join clause as the number of times that the particular join clause is used by different database operations executed within the database workload information.

The execution count refers to the number of times a particular statement was executed within the database workload information. If a first select statement related to a first join group was only executed a few times in the database workload information but a second select statement related to second join group was executed several hundred times, then the optimization selection service 114 would rank the second join group higher than the first join group, as implementing the second join group would yield an overall higher performance benefit as operations that benefit from the optimization are executed several hundred times.

Volatility of a table refers to how often data within a table is updated. If a table is frequently updated, then loading columns from the table into a performance optimization object, such as a join group, may not yield the expected performance gains because the object may need to be decompressed and then updated after each data change. The optimization selection service 114 may rank tables with less volatility higher than tables with more volatility, as frequent updates to values in a table may cause that table's processing performance to decrease due to the frequent updates needed.

IMU Generation Service

In an implementation, the IMU generation service 116 is implemented to select a subset of the set of performance optimizations, based on their ranking, and generate new versions of IMUs that implement performance optimizations in the subset of the set of optimizations. For example, if the ranked set performance optimizations contain 200 different performance optimizations, the IMU generation service 116 may select the top 10%, or the top 20 ranked performance optimizations to implement. The number of performance optimizations selected for implementation may vary depending on the number of performance optimizations in the set of performance optimizations. For instance, if the set of performance optimizations only contains 3 performance optimizations, then the IMU generation service 116 may implement all three performance optimizations. The number of performance optimizations selected may be configurable and may be based on the amount of available memory in the in-memory area 136. For example, if the used memory in the in-memory area 136 is only 25% of the total memory, then the IMU generation service 116 may select more performance optimizations than if the used memory in the in-memory area 136 is almost full.

In an implementation, the IMU generation service 116, when selecting performance optimizations, from the set of performance optimizations, the IMU generation service 116 may consider the amount of free space in the in-memory area 136 and the amount of space needed to implement each of the selected performance optimizations. For instance, if a particular performance optimization, such as a join group, requires 250 MB and the amount of free space in the in-memory area 136 is only 300 MB, then the IMU generation service 116 may elect not to implement this join group as it may use too much of the free space in the in-memory area 136.

In an implementation, the IMU generation service 116 may generate new versions of IMUs that contain or reference the selected performance optimizations. The new versions of IMUs may be separate copies of the current versions of IMUs and the new versions may be made invisible to user requests such that when user requests are received, DBMS 100 processes the user requests using the original versions of the IMUs, without the performance optimizations. This allows the performance analysis service 118 to test the new versions of IMUs, using the database workload information, to determine whether the new versions of IMUs produce the expected performance gains prior to fully implementing the new versions of IMUs.

In another implementation, the IMU generation service 116 may update existing versions of IMUs by updating columns in tables to enable a selected performance optimization. For example, if a column is a candidate for a bloom filter optimization, the IMU generation service 116 may annotate one or more columns with metadata, so that when segments of the table are repopulated in-memory, the column will be cached in an IMCU with the bloom filter optimization available, but not enabled. That is, the updated IMUs would function as if the performance optimizations were disabled. This allows for minimal interruptions to processing user requests, while the performance optimizations are tested. Although the performance optimizations are disabled, they are, however, are available for testing by the performance analysis service 118.

Performance Analysis Service

In an implementation, the performance analysis service 118 is configured to use the database workload information to test new IMUs that have newly implemented performance optimizations. The tests of the new IMUs may be referred to as verification tests, as the purpose of the verification tests is to verify that each performance optimization implemented yields an expected performance improvement using the database workload information. The performance analysis service 118 uses the subset of the database workload information, identified by the optimization selection service 114, to test the performance of the new IMUs. For instance, a particular verification test for a particular performance optimization would include the SQL statements from the subset of the database workload information that were used to identify the particular performance optimization as a candidate. For example, if the particular performance optimization is a join group that includes columns from a SALES and EMPLOYEE table, then the SQL statements from the subset of the database workload information would include SELECT statements that contain join clauses for columns in the SALES and EMPLOYEE table. The performance analysis service 118 runs verification tests on each of the performance optimizations implemented in new versions of IMUs order to measure the performance benefit of each performance optimization in isolation.

In an implementation, the performance analysis service 118 analyzes the results of the verification tests to determine whether the new performance optimizations yield performance improvements above a defined threshold. The defined threshold may be based on a percent improvement value, a defined factor, or any other user defined measurement. The performance improvement may represent any measured value related to performance, such as processing time to execute a database request. In one example, the defined threshold may be based on a certain percentage value, such as having the performance improvement (processing time), be higher than 20% to exceed the defined threshold. For instance, if a particular IMU, prior to implementing the particular performance optimization yielded a query processing time of 500 ms, then the results of the verification test would have to show an improved query processing time that is less than 400 ms in order to exceed the defined threshold. Performance optimizations that yield performance improvements that exceed the defined threshold are considered for implementation, while performance optimizations that do not exceed the defined threshold are not considered for implementation as these optimizations did not yield a meaningful performance improvement.

In another implementation, the performance analysis service 118 analyzes the results of the verification tests to determine whether the new performance optimizations yield expected results based on a cost benefit analysis calculation. The cost benefit analysis calculation may include determining a cost and a benefit, where the cost is measured in terms of additional memory needed to implement the performance optimization, and where the benefit is measured in terms of processing time improvement. The cost may be calculated as the percentage of additional memory needed to implement the IMU with the performance optimization. For example, if an IMU prior to implementing a performance optimization consumes 500 MB of memory in the in-memory area 136 and implementing a new join group for the IMU would require an additional 50 MB of memory, then the cost would be 10% (50 MB of additional memory/500 MB of memory used for IMU). The additional cost calculated may be compared to a defined cost threshold, where exceeding the cost threshold means that implementing the performance optimization would require more resources than expected. A higher than expected cost may result in fewer performance optimizations being implemented as there may not be enough available memory to implement all desired performance optimizations. The benefit, of the cost benefit analysis, may be a performance improvement representing any measured value related to performance, such as database request processing time. A defined performance threshold may be used to determine whether the performance exceeds the expected benefit.

The cost benefit analysis for each performance optimization may include calculating a percentage of processing improvement (benefit) and calculating a percentage of additional memory needed to implement the performance optimization (cost), and comparing the calculations to their respective thresholds. For example, if the benefit for a particular performance improvement was calculated to be an 8% with a defined performance threshold was 5%, and the cost was calculated to be 10% more memory with a defined cost threshold of 15%, then the cost benefit analysis would conclude that the benefit exceeds the defined performance threshold (8%>5% threshold), and the cost does not exceed the defined cost threshold (10%<15% threshold). The performance analysis service 118 would then consider the particular performance improvement for implementation based on the cost benefit analysis results.

In an implementation, the performance analysis service 118 ranks the performance optimizations based on their cost benefit analysis calculated, where the performance optimization with the highest cost benefit analysis value is ranked first.

Optimization Categorization Service

Upon performing the cost benefit analysis, the performance analysis service 118 sends the results to the optimization categorization service 120. In an implementation, the optimization categorization service 120 categorizes the performance optimizations into two groups, a first group containing performance optimizations that should be retained and enabled and a second group containing performance optimizations that should be discarded. The optimization categorization service 120 uses cost benefit values calculated from the verification tests to determine in which category each of the performance optimizations should be placed. The performance optimizations that had performance improvements below the defined performance threshold are not considered for implementation and are assigned to the second group as they do not yield meaning performance improvements. The performance optimizations that had performance improvements above the defined thresholds are considered for implementation and may be assigned to the first group.

In an implementation, the optimization categorization service 120 may further categorize performance optimizations initially assigned to the first group based on cost benefit analysis values. Specifically, the optimization categorization service 120 may evaluate the cost relative to the in-memory area 136 based on the amount of memory needed to implement the performance optimization in an IMU and the amount of available memory allotted to IMUs in the in-memory area 136. The memory that makes up the in-memory area 136 may contain a portion of memory that is budgeted for IMUs. The current memory budget may be automatically determined by the DBMS 100 or may be manually configured by a database administrator. An available memory budget refers to the amount of free space available for IMUs based on the current memory budget. The optimization categorization service 120, when determining which performance optimizations to implement, considers the available memory budget and the memory needed for each performance optimization. If implementing a particular performance optimization requires an amount of memory that exceeds the available memory budget, then the optimization categorization service 120 may reassign the particular performance optimization from the first group to a third group, where the third group represents performance optimizations that may be considered at a later time when there is a larger available memory budget. Performance optimizations that require an amount of memory that is less than the available memory budget are kept in the first group, which is the group containing performance optimizations to be retained.

In another implementation, the optimization categorization service 120 may further categorize performance optimizations initially assigned to the first group based on cumulative costs of implementing performance optimizations. A cumulative cost refers to the amount of additional memory needed to implement the performance optimizations initially assigned to the first group. The optimization categorization service 120 may enforce a cumulative cost threshold to ensure that the sum cost of implementing the performance optimizations in the first group does not exceed a certain percentage of the total allocation size for IMUs. For example, the cumulative cost threshold may be set to 25%, where the cost of implementing the performance optimizations should not exceed 25% of the total allocation size of IMUs in the in-memory area 136. If, for example, the cumulative cost of implementing the performance optimizations exceeds the cumulative cost threshold, then the optimization categorization service 120 may select and move one or more performance optimizations to the third group in order to reduce the cumulative cost of the performance optimizations in the first group. Selection and removal of a subset of performance optimizations from the first group to the third group may be based on the cost benefit analysis rankings of the performance optimizations.

In an implementation, after the optimization categorization service 120 assigns each of the performance optimizations to a group, the optimization categorization service 120 may make the performance optimizations assigned to the first group available for user requests. For instance, if the performance optimizations were implemented in new copies of the IMUs, then the older copies of IMUs, without the performance optimizations, are deallocated, while the new copies of the IMUs are activated for user requests. If, however, the performance optimizations were added to the original IMUs but the functionality was made invisible to user requests, then the optimization categorization service 120 would make the performance optimization visible to user request so that future user requests may benefit from the improved performance of the performance optimizations.

Additionally, the optimization categorization service 120 may deallocate the performance optimizations assigned to the second group. For example, if the performance optimizations were implemented in new copies of the IMUs, then the optimization categorization service 120 may simply deallocate those IMUs. If, however, the performance optimizations were added to the original IMUs but the functionality was made invisible to user requests, then the optimization categorization service 120 may remove any references to the performance optimizations from the IMU, such that when the IMU is repopulated, the IMU will not have any references to the performance optimization functionality.

Monitoring Service

The monitoring service 122 is configured to monitor performance of enabled performance optimizations to ensure that they are still providing their expected performance improvement on DB server instance 134. In an implementation, the monitoring service 122 may monitor usage and performance of IMUs with the performance optimization enabled. For example, the monitoring service 122 may monitor how many times a particular IMU was used for user requests over a period of time. If the usage rate of the particular IMU drops significantly from its prior usage rate, then it may be indicative of a change in the database workload information where expected SQL statements that use the particular IMU are not being executed. This may occur if there is a drop in demand for a particular query. As a result, the monitoring service 122 may suggest removing the performance optimization and/or the particular IMU altogether.

In an implementation, the monitoring service 122 may determine whether the particular performance optimization remains effective for user requests. For example, if the particular performance optimization is a join group and a query plan for a particular SQL statement is changed from using a hash join to a sort merge, then the change in the query plan would make the particular optimization (join group) for that IMU irrelevant with respect to the particular SQL statement. As a result, the monitoring service 122 may recommend removing the performance optimization from the IMU. Specifically, the monitoring service 122 may determine whether the particular performance optimization is still relevant is by analyzing the database workload information to determine the number of times the particular SQL statement was executed over a period of time. The monitoring service 122 may then determine the number of times the particular optimization (join group) was scanned over the same period of time. If the number of scans of the join group is relatively similar to the number of times the particular SQL statement was executed then the performance optimization is still relevant. If, however, the number of scans of the join group is less than the number of times the particular SQL statement was executed then the performance optimization may not be relevant anymore. As a result, the monitoring service 122 may suggest removing the performance optimization.

In an implementation, the monitoring service 122 may monitor performance metrics of the enabled performance optimizations to ensure that their expected performance gain is still present. For example, the monitoring service 122 may monitor processing times for SQL statements that use the performance optimizations to ensure that the optimizations are still performing as expected. For example, a particular performance optimization may be a join group, however, the performance of the join group may be dependent on the size of the input for the join. If the size of the input is larger than expected, then the join group may not perform as well as expected. If a performance optimization does not perform as well as expected, the monitoring service 122 may suggest removing the performance optimization.

Removal of a performance optimization may involve deallocating a particular IMU that has the performance optimization enabled and recreating the IMU without the performance optimization. Alternatively, the performance optimization may be disabled such that future user requests that use the particular IMU, use the IMU without the performance optimization. After the monitoring service 122 suggests removal of one or more <<IMUs enabled with performance optimizations, DBMS 100 may remove the one or more IMUs. Upon removal, the optimization categorization service 120 may evaluate the current memory budget in the in-memory area 136 to determine if any one of the performance optimizations in the third group should now be enabled, where the third group contains performance optimizations whose memory footprint was too large to enable previously. For example, if a particular vector optimization had a memory footprint of 500 MB and the current memory budget shows that the current available memory size is 1.5 GB, then the optimization categorization service 120 may assign the vector optimization to the first group and may implement the IMU associated with the vector optimization. In another implementation, prior to implementing the vector optimization, the performance analysis service 118 may run a validation test against the IMU with the vector optimization enabled to see if, given the current workload, the IMU still performs at the expected level of performance.

Process Overview

Figure 2:
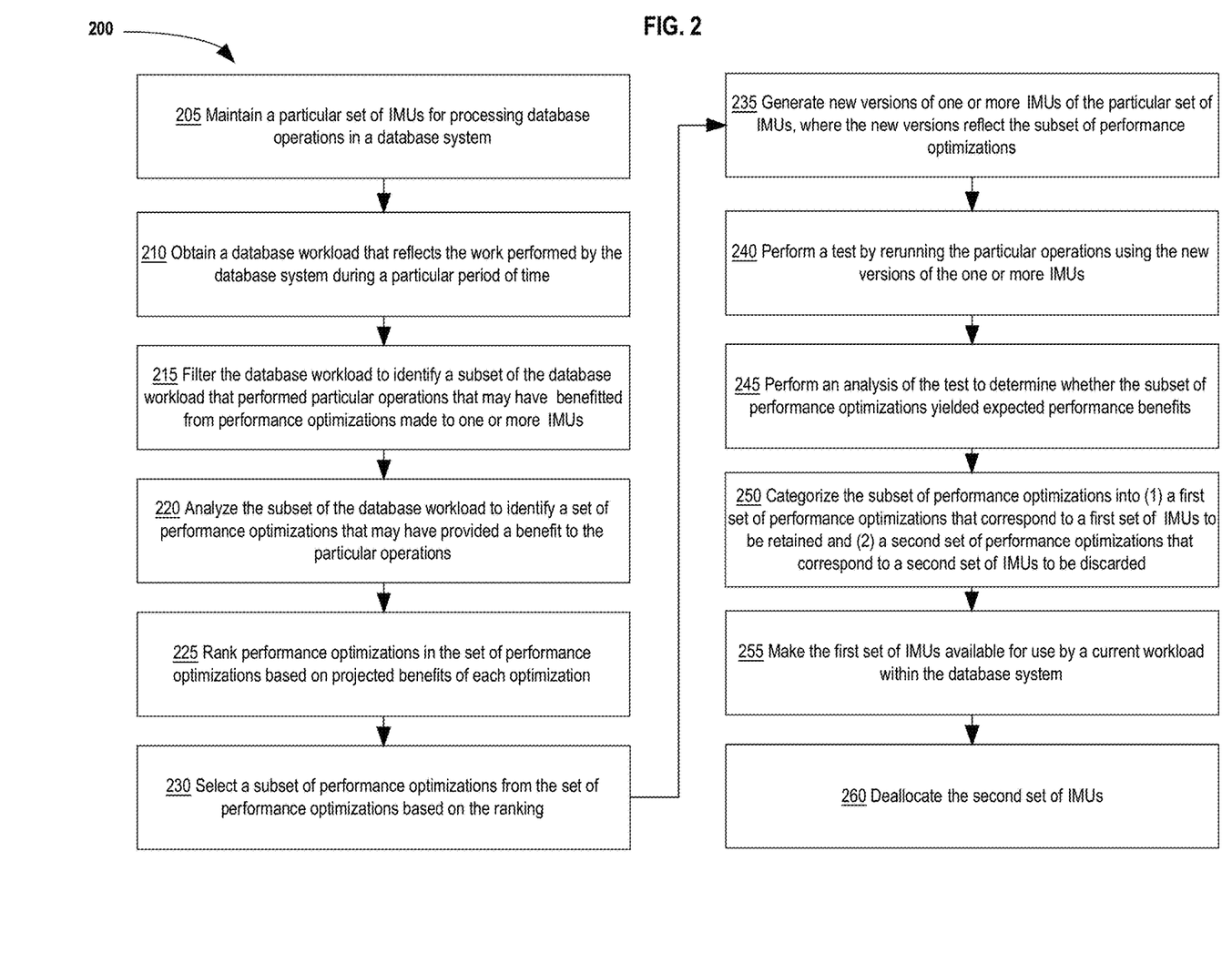
FIG. 2 is a flow diagram that depicts a process for automatically discovering potential performance optimizations for in-memory units, testing the potential performance optimizations, and implementing performance optimizations that show increased performance efficiency when processing database workloads, according to an embodiment.

FIG. 2 is a flow diagram that depicts a process 200 for automatically discovering potential performance optimizations for in-memory units, testing the potential performance optimizations, and implementing performance optimizations that show increased performance efficiency when processing database workload, according to an implementation. The steps of the process as shown in FIG. 2 may be implemented using processor-executable instructions that are stored in computer memory. For the purposes of providing a clear example, the steps of FIG. 2 are described as being performed by processes executing in DBMS 100. For the purposes of clarity, the process described may be performed with more or fewer steps than described in FIG. 2.

At step 205, process 200 maintains a particular set of IMUs for processing database operations in a database system. In an implementation, DBMS 100 runs DB server instance 134 on node 130. Within node 130, the in-memory area 136 contains the particular set of IMUs used by DB server instance 134 to process database requests.

At step 210, process 200 obtains a database workload information that reflects the work performed by the database system during a particular period of time. In an implementation, the SQL collection service 112 collects SQL commands executed on DB server instance 134 over a particular period of time. For instance, the SQL collection service 112 collects SQL commands executed on DB server instance 134 over a 24 hour period. The collection of SQL commands represents the database workload information for DB server instance 134.

At step 215, process 200 filters the database workload information to identify a subset of the database workload information that performed particular operations that may have benefitted from performance optimizations made to one or more IMUs. In an implementation, the optimization selection service 114 analyzes the database workload information to identify SQL commands whose processing efficiency would be improved by implementing a performance optimization. For example, the optimization selection service 114 may identify specific SELECT statements in the database workload information that contain join clauses. The join clauses may benefit from improved performance by implementing a performance optimization, such as a join group containing the columns from tables specified in the join clauses.

At step 220, process 200 analyzes the subset of the database workload information to identify a set of performance optimizations that may have provided a benefit to the particular operations. In an implementation, the optimization selection service 114 analyzes the particular operations in the subset of the database workload information and identifies potential performance optimizations that may be implemented. Using the previous example, the optimization selection service 114 may identify, from specific SELECT statements, the columns from tables that may be added to a join group which then may be used to improve processing performance of the specific SELECT statements. In another example, the optimization selection service 114 may have previously identified SELECT statements that contain arithmetic operations. The optimization selection service 114 may then identify certain performance optimizations, such as optimized arithmetic operations, that may improve query processing for the SELECT statements that contain the arithmetic operations.

At step 225, process 200 ranks the performance optimizations in the set of performance optimizations based on projected benefits of each optimization. In an implementation, the optimization selection service 114 ranks each of the performance optimizations in the set of performance optimizations based on which optimizations yield the best potential performance benefit. The optimization selection service 114 may consider factors such as frequency of values in columns, execution count for specific SQL statements, and volatility of tables. For example, if the execution count for a first SELECT statement, which may benefit from a first join group is relatively low compared to a second SELECT statement which has a high execution count and may benefit from a second join group, the optimization selection service 114 may rank the second join group for the second SELECT statement higher than the first join group for the first SELECT statement because the aggregated benefit for the second join group would be higher due to the increased execution count.

At step 230, process 200 selects a subset of performance optimizations from the set of performance optimizations based on the ranking. In an implementation, the IMU generation service 116 uses the ranking of the performance optimizations to select a subset of performance optimizations for generation and validation testing.

At step 235, process 200 generates new versions of one or more IMUs of the particular set of IMUs, where the new versions reflect the subset of performance optimizations. The IMU generation service 116 generates new versions of IMUs that contain performance optimizations from the subset of performance optimizations. In an implementation, the new versions of IMUs are separate copies of the current IMUs and are made invisible to user requests. User requests are still processed using the current IMUs without the new performance optimizations. In another implementation, the IMU generation service 116 may update the existing IMUs to insert functionality for the performance optimizations. The functionality for the performance optimizations may be disabled until the performance optimizations have been tested and verified.

At step 240, process 200 performs a test by rerunning the particular operations using the new versions of the one or more IMUs. In an implementation, the performance analysis service 118 runs a validation test on the new versions of the one or more IMUs using the subset of the database workload information to test the performance of the new versions of the one or more IMUs. For example, if the performance analysis service 118 is testing a new version of an IMU that contains a join group, then the performance analysis service 118 may use SELECT statements that contain join clauses that reference columns from tables that are in the join group.

At step 245, process 200 performs an analysis of the test to determine whether the subset of performance optimizations yielded expected performance benefits. In an implementation, the performance analysis service 118 analyzes the results of the verification test to determine whether the new performance optimizations yield performance improvements above a defined threshold. The defined threshold may represent a performance benefit threshold that determines whether a performance optimization yields an expected performance benefit. The defined threshold may be based on a percent value, such as a 20% performance improvement. For example, if a particular IMU, prior to implementing the particular performance optimization yielded a query processing time of 500 ms, then the results of the verification test would have to show an improved query processing time that is less than 400 ms (20% improvement) in order to exceed the defined threshold.

In another implementation, the analysis performed by the performance analysis service 118 may include performing a cost benefit analysis on each performance optimization in the subset of performance optimizations. The cost benefit analysis calculation may include a cost that measures the increase in memory needed to implement the performance optimization and a benefit that measures the improved processing time. The performance analysis service 118 analyzes the measured costs and measure benefits to determine whether the cost is below a defined cost threshold and the benefit is above a defined benefits threshold. The performance analysis service 118 may rank the performance optimizations in the subset of performance optimizations based on the cost benefit analysis values, where the performance optimization with the highest cost benefit analysis value is ranked first.

At step 250, process 200 categorizes the subset of performance optimizations into (1) a first set of performance optimizations that correspond to a first set of IMUs to be retained and (2) a second set of performance optimizations that correspond to a second set of IMUs to be discarded. In an implementation, the optimization categorization service 120 categorizes the performance optimizations into two categories, a first category that corresponds to the first set of IMUs to be retained and a second category that corresponds to the second set of IMUs to be discarded. The first set of performance optimizations that correspond to the first set of IMUs showed, during the verification test, an expected performance improvement, and as result will be implemented for use by a current workload. The second set of performance optimizations that correspond to the second set of IMUs failed to show, during the verification test, an expected performance improvement, and as result will not be implemented and will be discarded.

At step 255, process 200 makes the first set of IMUs available for use by a current workload within the database system. In an implementation, DBMS 100 makes the first set of IMUs, which contain the first set of performance optimizations, visible to user requests such that the first set of IMUs are used for processing the current workload. At step 260, process 200 deallocates the second set of IMUs. In an implementation, DBMS 100 deallocates the second set of IMUs.

In an implementation, the monitoring service 122 monitors the performance of the first set of IMUs to ensure that the first set of IMUs are performing at an expected level. If usage and/or performance of any of the first set of IMUs decreases, the monitoring service 122 may recommend removing the IMU or removing, from the IMU, the performance optimization.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
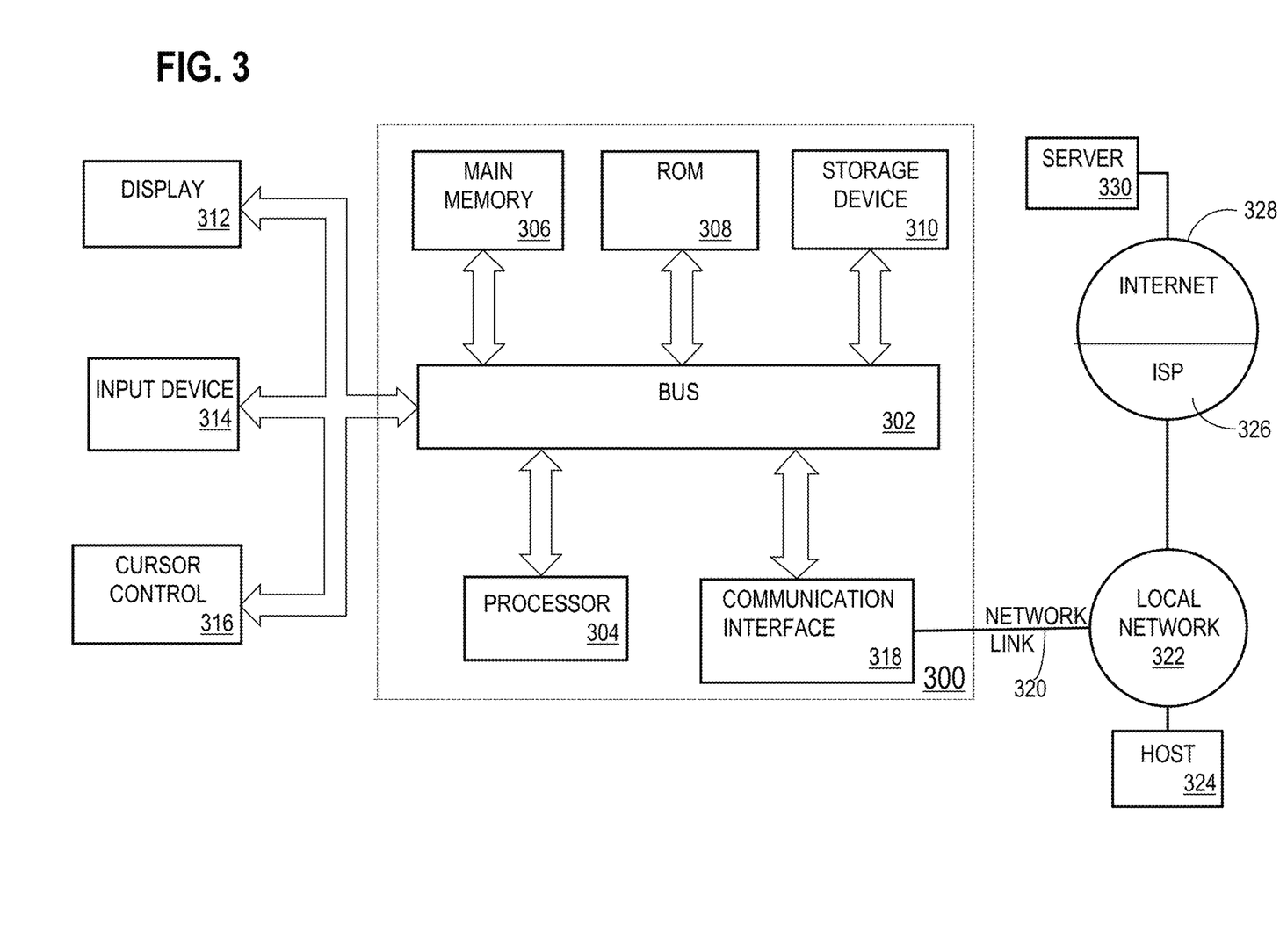
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    maintaining a particular set of in-memory units (IMU) for processing database operations in a database system;
    obtaining database workload information that reflects work performed by the database system during a particular period of time;
    filtering the database workload information to identify a subset of the database workload information that performed particular operations that potentially would have benefitted from performance optimizations made to one or more IMUs of the particular set of IMUs;

analyzing the subset of the database workload information to identify a set of performance optimizations that potentially would have provided a benefit to the particular operations;

ranking performance optimizations in the set of performance optimizations based, at least in part, on projected benefits of each performance optimization;

based on the ranking, selecting a subset of performance optimizations from the set of performance optimizations;

generating new versions of one or more IMUs of the particular set of IMUs, wherein the new versions reflect the subset of performance optimizations, where generating new versions includes updating the one or more IMUs to contain functionality corresponding to the subset of performance optimizations to generate the new versions of the one or more IMUs; and making a first set of IMUs available for use by a current workload within the database system, wherein the first set of IMUs includes at least a subset of the new versions of one or more IMUs.

2. The method of claim 1, further comprising determining the first set of IMUs by:

performing a test by rerunning the particular operations using the new versions of the one or more IMUs;

based on the test, performing an analysis to determine whether the subset of performance optimizations yielded expected performance benefits;

based on the analysis, categorizing the subset of performance optimizations into:
a first set of performance optimizations that correspond to the first set of IMUs, to be retained, and
a second set of performance optimizations that correspond to a second set of IMUs, of the new versions of one or more IMUs, to be discarded.

3. The method of claim 1, wherein the new versions of the one or more IMUs are separate copies of the one or more IMUs of the particular set of IMUs; and wherein making the first set of IMUs available for use by the current workload within the database system, comprises:
activating the first set of IMUs which correspond to the first set of performance optimizations;
deallocating a subset of the one or more IMUs, of the particular set of IMUs, that correspond to the first set of IMUs.

4. The method of claim 1, wherein the functionality corresponding to the subset of performance optimizations in the new versions of the one or more IMUs is disabled for use by the current workload within the database system.

5. The method of claim 4, wherein making the first set of IMUs available for use by the current workload within the database system comprises enabling the functionality corresponding to the first set of performance optimizations in the first set of IMUs.

6. The method of claim 2, wherein performing the analysis to determine whether the subset of performance optimizations yielded expected performance benefits comprises:

for each performance optimization of the subset of performance optimizations:
calculating a performance gain of said performance optimization, wherein the performance gain is a percentage of computing time saved by implementing said performance optimization; and determining whether the performance gain exceeds a defined performance threshold.

7. The method of claim 6, wherein performing the analysis to determine whether the subset of performance optimizations yielded expected performance benefits, further comprises:

for each performance optimization of the subset of performance optimizations:
determining an additional amount of memory needed to implement said performance optimization;
calculating a performance cost of said performance optimization, wherein the performance cost is a percentage of the additional amount of memory needed to implement said performance optimization compared to an amount of memory needed to implement an IMU without said performance optimization;
determining whether the performance cost does not exceed a defined cost threshold.

8. The method of claim 1, wherein the projected benefits of each performance optimization is based on factors that include at least one of a frequency count, execution count, and volatility of one or more tables associated with the each performance optimization;

wherein the frequency count represents a number of times a performance optimization could be used within queries executed over a period of time;

wherein the execution count represents a number of times a query or stored procedure uses a specific performance optimization over the period of time;

wherein the volatility of the one or more tables associated with the each performance optimization represents a frequency for which rows in the one or more tables are updated over the period of time.

9. The method of claim 1, further comprising:

upon making the first set of IMUs available for use by the current workload, monitoring performance of the current workload on the database system with respect to the first set of IMUs;

detecting a drop in a rate of usage of a first IMU of the first set of IMUs; and deallocating the first IMU of the first set of IMUs.

10. The method of claim 1, further comprising:

upon making the first set of IMUs available for use by the current workload, monitoring performance of the current workload on the database system with respect to the first set of IMUs;

identifying a set of executed SQL statements in the current workload that used a first IMUs of the first set of IMUs a first particular number of times;

detecting that the set of executed SQL statements in the current workload that used a first performance optimization, which is part of the first IMU, a second particular number of times;

upon determining that the second particular number of times is less than the first particular number of times, generating a second version of the first IMU, wherein the second version of the first IMU does not contain the first performance optimization;

making the second version of the first IMU available for use by the current workload within the database system; and deallocating the first IMU.

11. A non-transitory computer-readable storage medium storing sequences of instructions that, when executed by one or more processors, cause:

maintaining a particular set of in-memory units (IMU) for processing database operations in a database system;

obtaining database workload information that reflects work performed by the database system during a particular period of time;

filtering the database workload information to identify a subset of the database workload information that performed particular operations that potentially would have benefitted from performance optimizations made to one or more IMUs of the particular set of IMUs;

analyzing the subset of the database workload information to identify a set of performance optimizations that potentially would have provided a benefit to the particular operations;

ranking performance optimizations in the set of performance optimizations based, at least in part, on projected benefits of each performance optimization;

based on the ranking, selecting a subset of performance optimizations from the set of performance optimizations;

generating new versions of one or more IMUs of the particular set of IMUs, wherein the new versions reflect the subset of performance optimizations, where generating new versions includes updating the one or more IMUs to contain functionality corresponding to the subset of performance optimizations to generate the new versions of the one or more IMUs; and making a first set of IMUs available for use by a current workload within the database system, wherein the first set of IMUs includes at least a subset of the new versions of one or more IMUs.

12. The non-transitory computer-readable storage medium of claim 11, the sequences of instructions including instructions that, when executed by the one or more processors, cause, determining the first set of IMUs by:

performing a test by rerunning the particular operations using the new versions of the one or more IMUs;

based on the test, performing an analysis to determine whether the subset of performance optimizations yielded expected performance benefits;

based on the analysis, categorizing the subset of performance optimizations into:
  a first set of performance optimizations that correspond to the first set of IMUs, to be retained, and
  a second set of performance optimizations that correspond to a second set of IMUs, of the new versions of one or more IMUs, to be discarded.

13. The non-transitory computer-readable storage medium of claim 11, wherein the new versions of the one or more IMUs are separate copies of the one or more IMUs of the particular set of IMUs; and wherein making the first set of IMUs available for use by the current workload within the database system, comprises:
  activating the first set of IMUs which correspond to the first set of performance optimizations;
  deallocating a subset of the one or more IMUs, of the particular set of IMUs, that correspond to the first set of IMUs.

14. The non-transitory computer-readable storage medium of claim 11, wherein the functionality corresponding to the subset of performance optimizations in the new versions of the one or more IMUs is disabled for use by the current workload within the database system.

15. The non-transitory computer-readable storage medium of claim 14, wherein making the first set of IMUs available for use by the current workload within the database system comprises enabling the functionality corresponding to the first set of performance optimizations in the first set of IMUs.

16. The non-transitory computer-readable storage medium of claim 12, wherein performing the analysis to determine whether the subset of performance optimizations yielded expected performance benefits comprises:

for each performance optimization of the subset of performance optimizations:
  calculating a performance gain of said performance optimization, wherein the performance gain is a percentage of computing time saved by implementing said performance optimization; and
  determining whether the performance gain exceeds a defined performance threshold.

17. The non-transitory computer-readable storage medium of claim 16, wherein performing the analysis to determine whether the subset of performance optimizations yielded expected performance benefits, further comprises:

for each performance optimization of the subset of performance optimizations:
  determining an additional amount of memory needed to implement said performance optimization;
  calculating a performance cost of said performance optimization, wherein the performance cost is a percentage of the additional amount of memory needed to implement said performance optimization compared to an amount of memory needed to implement an IMU without said performance optimization;
  determining whether the performance cost does not exceed a defined cost threshold.

18. The non-transitory computer-readable storage medium of claim 11, wherein the projected benefits of each performance optimization is based on factors that include at least one of a frequency count, execution count, and volatility of one or more tables associated with the each performance optimization;

wherein the frequency count represents a number of times a performance optimization could be used within queries executed over a period of time;

wherein the execution count represents a number of times a query or stored procedure uses a specific performance optimization over the period of time;

wherein the volatility of the one or more tables associated with the each performance optimization represents a frequency for which rows in the one or more tables are updated over the period of time.

19. The non-transitory computer-readable storage medium of claim 11, the sequences of instructions including instructions that, when executed by the one or more processors, cause:

upon making the first set of IMUs available for use by the current workload, monitoring performance of the current workload on the database system with respect to the first set of IMUs;

detecting a drop in a rate of usage of a first IMU of the first set of IMUs; and deallocating the first IMU of the first set of IMUs.

20. The non-transitory computer-readable storage medium of claim 11, the sequences of instructions including instructions that, when executed by the one or more processors, cause:

upon making the first set of IMUs available for use by the current workload, monitoring performance of the current workload on the database system with respect to the first set of IMUs;

identifying a set of executed SQL statements in the current workload that used a first IMUs of the first set of IMUs a first particular number of times;

detecting that the set of executed SQL statements in the current workload that used a first performance optimization, which is part of the first IMU, a second particular number of times;

upon determining that the second particular number of times is less than the first particular number of times, generating a second version of the first IMU, wherein the second version of the first IMU does not contain the first performance optimization;

making the second version of the first IMU available for use by the current workload within the database system; and deallocating the first IMU.

* * * * *